United States Patent
Johansson et al.

(10) Patent No.: US 8,860,723 B2
(45) Date of Patent: Oct. 14, 2014

(54) BOUNDED SIMPLIFICATION OF GEOMETRICAL COMPUTER DATA

(75) Inventors: Gustaf Johansson, Linkoping (SE); Hans Ulrik Lindahl, Liungsbro (SE); Mahiar Hamedi, Linkoping (SE)

(73) Assignee: Donya Labs AB, Linkoping (SE)

( * ) Notice: Subject to any disclaimer, the term of this patent is extended or adjusted under 35 U.S.C. 154(b) by 1051 days.

(21) Appl. No.: 12/720,175

(22) Filed: Mar. 9, 2010

(65) Prior Publication Data
US 2010/0277476 A1  Nov. 4, 2010

(30) Foreign Application Priority Data

Mar. 9, 2009  (SE) ........................................ 0900292

(51) Int. Cl.
*G06T 15/20* (2011.01)
*G06T 15/00* (2011.01)
*G06T 17/00* (2006.01)
*G06T 17/20* (2006.01)

(52) U.S. Cl.
CPC .................................... *G06T 17/20* (2013.01); *G06T 17/205* (2013.01)
USPC .............................. 345/423; 345/419; 345/420

(58) Field of Classification Search
CPC ............................... G06T 17/20; G06T 17/205
See application file for complete search history.

(56) References Cited

U.S. PATENT DOCUMENTS

| | | | |
|---|---|---|---|
| 5,929,860 | A | 7/1999 | Hoppe |
| 6,198,486 | B1 | 3/2001 | Junkins et al. |
| 6,362,820 | B1 | 3/2002 | Hoppe |
| 6,424,351 | B1 * | 7/2002 | Bishop et al. .................. 345/582 |
| 6,771,261 | B2 | 8/2004 | MacPherson |
| 2002/0003539 | A1 * | 1/2002 | Abe ................................ 345/428 |
| 2003/0151604 | A1 * | 8/2003 | Kaufman et al. ............. 345/419 |
| 2005/0099420 | A1 * | 5/2005 | Hoppe ........................... 345/420 |

OTHER PUBLICATIONS

Hoppe et al., "Mesh Optimization," Computer Graphics Proceedings, Annual Conference Series, 19-26 (1993).*
Garland and Heckbert, "Surface Simplification Using Quadric Error Metrics," Computer Graphics (SIGGRAPH '97 Proceedings) (1997), 209-216.*
Antonio Diaz-Calderon, Christiaan J.J. Paredis, Pradeep K. Khosla, "Combining Information Technology Components and Symbolic Equation Manipulation in Modeling and Simulation of Mechatronic Systems," Proceedings of 1999 IEEE, International Symposium on Computer Aided Control System Design, Kohala Coast-Island of Hawaii, Hawaii, USA, Aug. 22-27, 19.*
Lindberg, Vern, "Uncertainties and Error Propagation Part I of a manual on Uncertainties, Graphing, and the Vernier Caliper", Jul. 1, 2000. http://www.rit.edu/~w-uphysi/uncertainties/Uncertaintiespart1.html#relabs.*
Cohen et al., "Simplification Envelopes", http://www.cs.unc.edu/-geom/envelope.html, 1996, pp. 119-128.
Zelinka et al. "Permission Grids: Practical, Error-Bounded Simplification", ACM Transactions on Graphics, vol. 21, No. 2, Apr. 2002, pp. 1-25, University of Illinois at Urbana-Champaign.

* cited by examiner

*Primary Examiner* — Kee M Tung
*Assistant Examiner* — Sing-Wai Wu
(74) *Attorney, Agent, or Firm* — Howard & Howard Attorneys PLLC

(57) ABSTRACT

This invention discloses a method for simplifying geometrical data in higher dimensions and in particular reducing three-dimensional (3D) mesh (801) from an original 3D mesh (800). The simplification method comprises a series of reduction steps combined with operations that map the original data onto the reduced data in subsequent steps. The mapping allows calculation of absolute geometrical metrics, including distance and volume, for bounded simplification.

21 Claims, 8 Drawing Sheets

Fig. 6
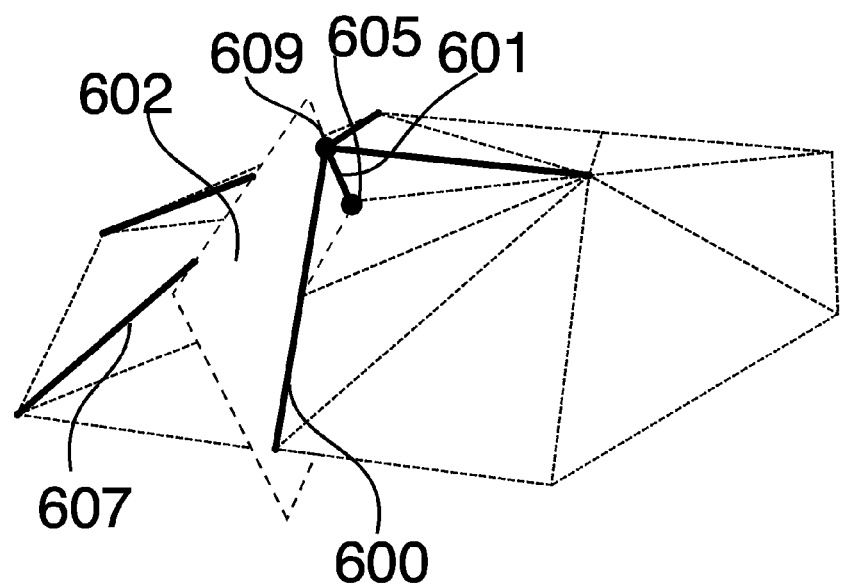
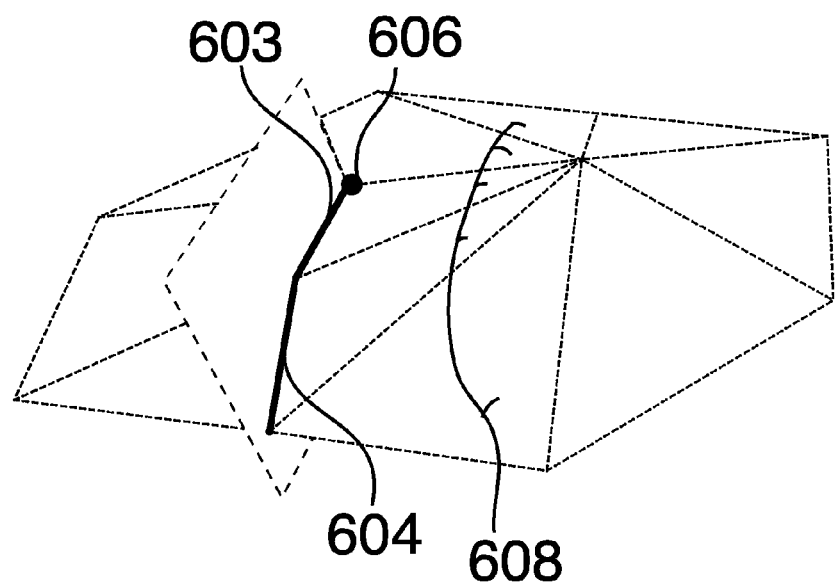

Fig. 8
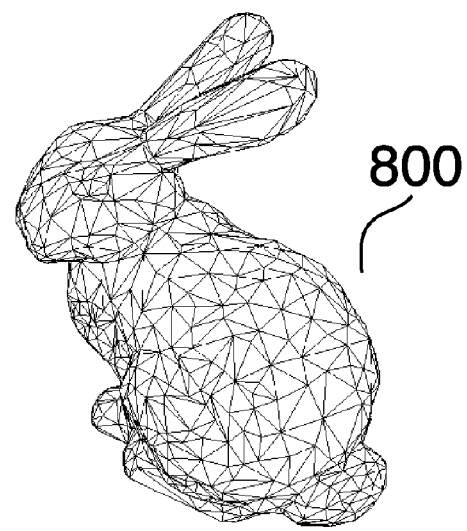
800
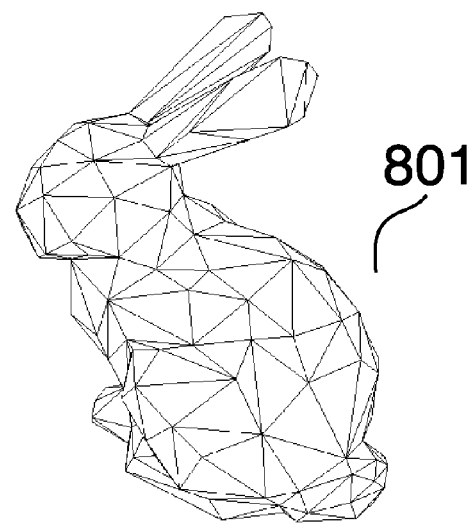
801
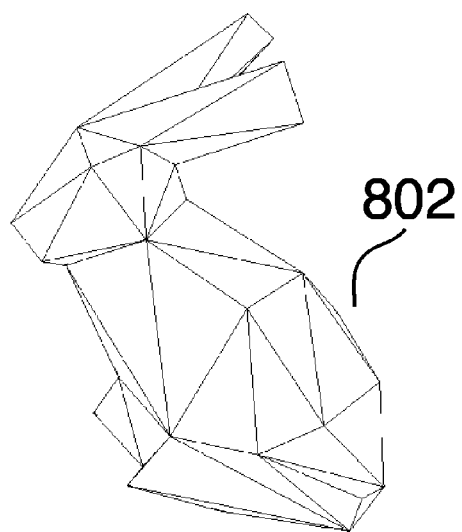
802

BOUNDED SIMPLIFICATION OF GEOMETRICAL COMPUTER DATA

This application claims priority to and all the advantages of Swedish Patent Application No. 0900292-4, filed on Mar. 9, 2009.

TECHNICAL FIELD

This invention relates generally to three-dimensional sampling, modeling and visualization using polygonal meshes for computer graphics, and more particularly to techniques for automatic optimization of polygonal mesh models.

BACKGROUND ART

Three-dimensional (3D) models in computer graphics are often represented using triangle meshes. Many meshes are typically not optimized for display or simulation performance. In most applications, these initial meshes can usually be replaced by decimated versions that could be approximations of the initial mesh with fewer triangles, making them more suited for particular applications. In many applications it is desired that the decimated mesh should has a maximum distance deviation from the original mesh. This distance could be important for applications that depend on actual physical distances such as 3D scanning, physical simulations, CAD/CAM/CAE/FEA, or visualization applications where the absolute distance could instead be mapped onto a maximum display pixel error deviation.

Some previous work in mesh decimation includes schemes based on edge collapse of meshes [Hughes Hoppe, "Mesh simplification and construction of progressive meshes", U.S. Pat. No. 5,929,860], [Quadric metric for simplifying meshes with appearance attributes, [U.S. Pat. No. 6,362,820], [U.S. Pat. No. 6,198,486]. In another edge collapse invention [U.S. Pat. No. 6,771,261] a method is described for calculating an absolute distance metric during an iterative edge collapse. Here only a distance from edge to planes is calculated, and the result is an algorithm that does no guaranty a final mesh that is within defined absolute distance boundary. In summary none of the iterative edge collapse simplification schemes preserve an absolute geometric value, such as distance, between the original 3D mesh and the decimated 3D mesh, since no additional data that is saved during collapse, which can handle calculation of absolute geometric values in a correct manner.

Other mesh simplification methods have constraints in order to preserve a certain absolute distance of the 3D mesh upon decimation. The surface envelopes method uses a surface boundary around the object in a pre-process and uses this during the simplification process. ["Simplification Envelopes" (1996 siggraph), Jonathan Cohen, Amitabh Varshney, Dinesh Manocha, Greg Turk, Hans Weber, Pankaj Agarwal, Frederick Brooks, William Wright]. Yet another method comprises pre-calculating a voxel volume around the original mesh object and using this for calculating absolute distances during mesh simplification. [S. Zelinka and M. Garland. "Permission Grids: Practical, Error-Bounded Simplification." ACM Transactions on Graphics, 21(2), (2002)]. The disadvantages with these methods are that they only allow a limited class of 2-manifold 3D meshes to be simplified within a distance bound. Furthermore they are memory consuming, and time consuming, since surface boundaries have to be pre-calculated and stored. Other drawbacks of these schemes are they do not give access to knowledge about what part of the original mesh that corresponds to a specific part on the reduced mesh.

SUMMARY OF INVENTION

The problem with previous mesh simplification algorithms is that none of them allow for a general method for simplification of 3D meshes with arbitrary size and type within an absolute spatial boundary, such as distance and volume.

This invention describes a method of optimizing geometrical data, such as mesh models 800. The method comprises the steps of first simplifying geometrical data by removing parts of the data 101, and then projecting the removed data and also reprojecting previously saved projected data onto the simplified data 504. The projected data is then saved with its corresponding instances to original data for later use. These steps are then repeated in order to reach a final simplified data.

This method of simplifying data is particularly interesting for data comprising a mesh 800 in three dimensions or more. In the case of three dimensional meshes the steps of removing data according to claim 1 comprise removing vertices and edges that constitute the mesh data. The disclosed method of moving mesh data comprises:

Choosing an edge 202 in the mesh 200 and performing an edge removal operation on the chosen edge, wherein the pair of vertices 201, 206 connected by the chosen edge 202, the mesh 204 is replaced with a single new vertex 205 resulting in a reduced number of new triangles/faces defining a reduced group. The step of projecting data comprises projecting the vertices and edges belonging to the initial mesh within the original group onto the reduced group, and also re projecting all previously saved projected vertices and edges, onto the reduced group.

The method of projecting data according to claim 2 comprise moving the position of the vertices and edges of the initial group 600 onto the surfaces that belong to the triangles of the reduced group 604. The projection can further be optimized by choosing the position of the projected vertices and edges so that the distances 601 between the vertices 605, 609 and edges of the initial group and the distance of the moved vertices and edges are minimized.

The method of data simplification according to claim 1, and claim 2 has the advantage that it allows simplifying the data within a pre-defined metric bound such as spatial distance or volume. This can be done by calculating the metric from the saved projected data and their corresponding instances to the original mesh, and repeating the steps of removing data from the geometrical data to generate simplified data, projecting the removed data onto the simplified data, saving the projected data, saving instances of the initial geometrical data for each projected data, and reprojecting the previously saved projected data onto the simplified data in claim 1 until all metric values are outside a pre-defined metric bound, such as an absolute distance or an absolute volume, to obtain a bounded simplified data.

The described method of simplifying data within a metric bound can further be used in a method of successive simplification of data 800 for obtaining several data sets with different level of detail. The successive simplification comprises the steps of first performing the method of bounded simplification, to obtain a simplified geometrical data 801, and saving the simplified data. The absolute metric bound is then increased and the method of bounded simplification is repeated to obtain a second simplified data 802, and so on.

In the method of claim 2 and claim 6 the metric can comprise a spatial distance 702, for distance bounded simplification. A method for calculating the distance comprises calculating the geometrical distance between the projected vertices 505 and their corresponding instanced initial vertices 503, and also calculating the geometrical distances 308 between the projected edges 309,310 and their corresponding original edges 311. The largest calculated distance is then chosen as the absolute distance metric. Other metric values according to claims 2, 6 can comprise volume. The volume can be calculated by calculating the spatial volume occupying the space between the projected data and its corresponding initial data.

All the described methods of simplifying data can be performed in a parallel fashion by performing the steps of simplification on different parts of the same initial mesh in a number of parallel steps, using for example multi core processors.

The method of choosing an edge according to claim 2 can be done by choosing one arbitrary edge among all possible edges, including choosing an edge randomly, or based on the data position of the edge. Other methods of choosing an edge can comprises first calculating an edge removal error value, using methods such as a quadric error method, for each edge and then choosing the edge with the minimum error value. In many geometrical data types preservation of features at different borders within the data is of importance. A method of preserving the border edges in the disclosed simplification method, such as outer edges, or edges in borders between materials/textures, comprises assigning larger error values for the edges that belong to the borders.

The described methods of simplifying data within geometrical bounds can also be mixed with other geometry optimization methods, such as including joining vertices, joining vertices and edges, joining edge and edge, removal of sliver triangles, removal of T-junctions, hole-filling, and different combinations of these. The methods of general geometry operation can be performed before or after performing the simplification method of claim 1.

The simplification methods can also be used to optimize texture data, by projecting information from an initial 3D mesh onto a 2D texture belonging to the simplified mesh. The type of projected information can comprise normal maps, occlusion maps, or displacement maps.

The methods of simplifying geometric data to an absolute distance can be used to optimize data to an absolute screen 700 pixel size 701, which is of great importance for visualization applications. This can be done by simplifying a mesh to an absolute distance bound, where the distance is chosen to be proportional to the absolute spatial size of the data divided by the absolute screen pixel size 704.

A similar method can be applied for three-dimensional pixels (voxels). This method is specially useful when a three dimensional mesh is first created from a voxel volume, using an any arbitrary method of voxel to mesh transformation, and then simplified with a distance bound that is proportional to the voxel size.

The bounded simplification method of claim 6 can also be useful for other applications.

In applications where the mesh data is acquired using a three-dimensional scanner, an absolute distance bound can be chosen to be proportional to the absolute distance inaccuracy of the scanner apparatus, to automatically simplify the scanned data.

Other applications include computer aided manufacturing (CAM), where 3D mesh data that is to be manufactured can be optimized with a distance metric that is proportional to the absolute accuracy of the computer aided manufacturing apparatus. Further applications include computer simulation, where the metric bound can be defined by the accuracy of the respective simulation, including finite element method simulations, mechatronics, rigid body dynamics or other simulations that use geometrical data.

The saved projected data according to claims 1, 2 can be used in a method for performing geometric morphing between different levels of simplified meshes. The method of morphing comprises adding the saved projected vertices and edge data 101 to the simplified mesh and then moving the added projected data stepwise through a trajectory 103 to its corresponding instanced initial value 102, for a smooth transition between levels of data (morphing).

The disclosed method of bounded data simplification can be applied to very large geometrical data sets, by first splitting the data into hierarchical subgroups, and then performing simplification on each hierarchical subgroup. The simplified subgroups can be further saved and re-used in visualization applications.

The disclosed methods of geometrical simplification can be mixed with any other type of geometrical data modification method, where the other method can be performed before, after or in-between the disclosed simplification methods.

BRIEF DESCRIPTION OF THE DRAWINGS

FIG. 6. Displays optimized projection of and edge onto reduced 3D mesh data by projecting through a normal plane.

FIG. 8. Shows a 3D initial mesh and two reduced meshes of the initial mesh, with two different distance bounds.

DETAILED DESCRIPTION

General Background

Figure 1:
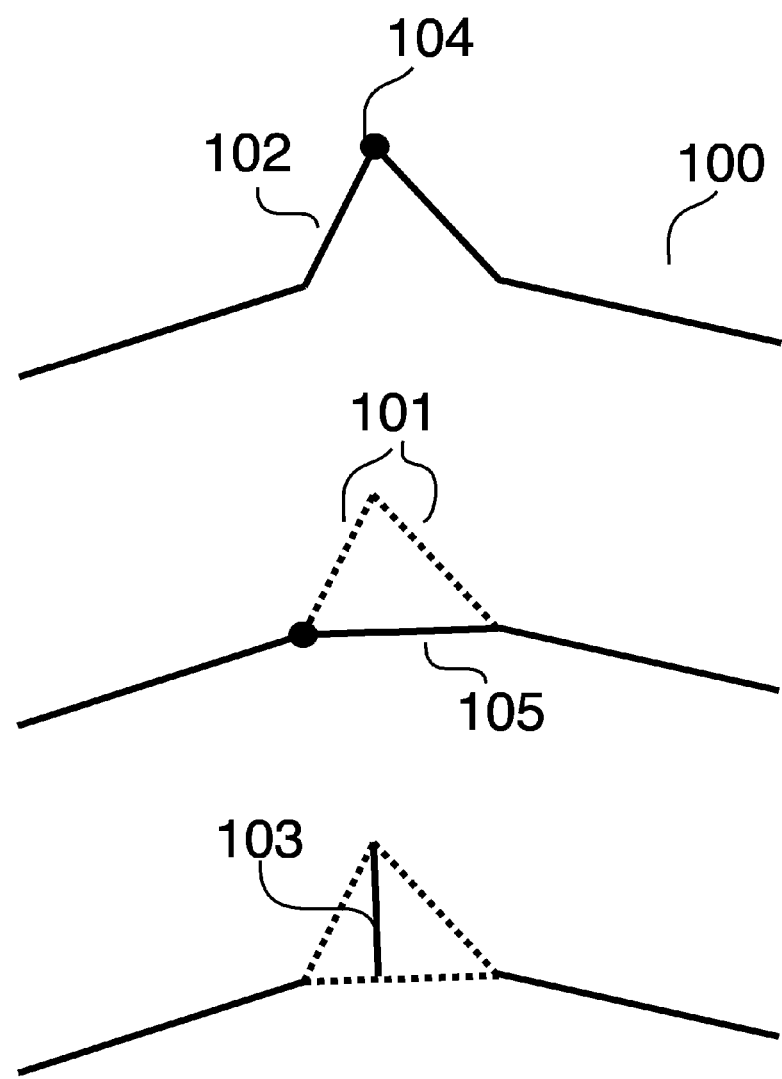
FIG. 1. Shows a part of a 2D geometrical data that is simplified, and also shows a distance between the original and reduced data.
Figure 2:
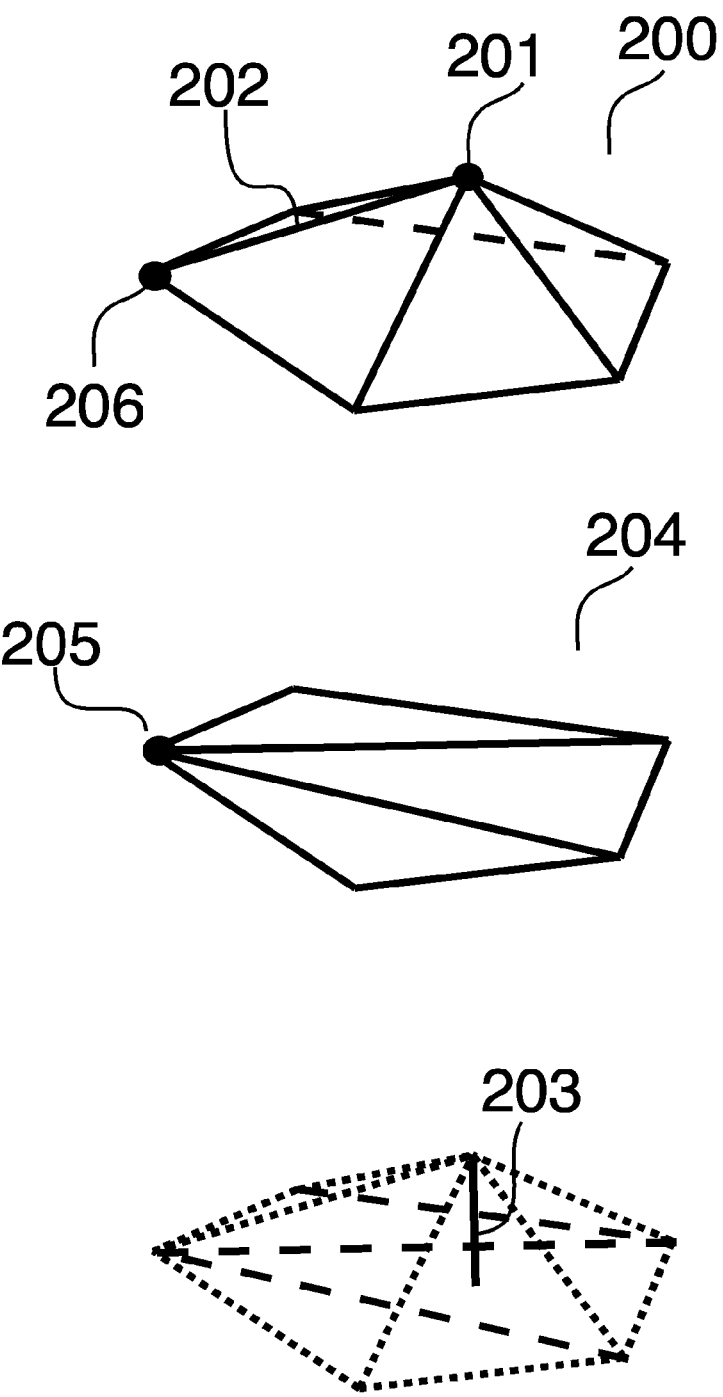
FIG. 2. Displays a 3D mesh data group that is simplified in edge collapse, and also shows a distance between the simplified mesh and the original mesh.
Figure 3:
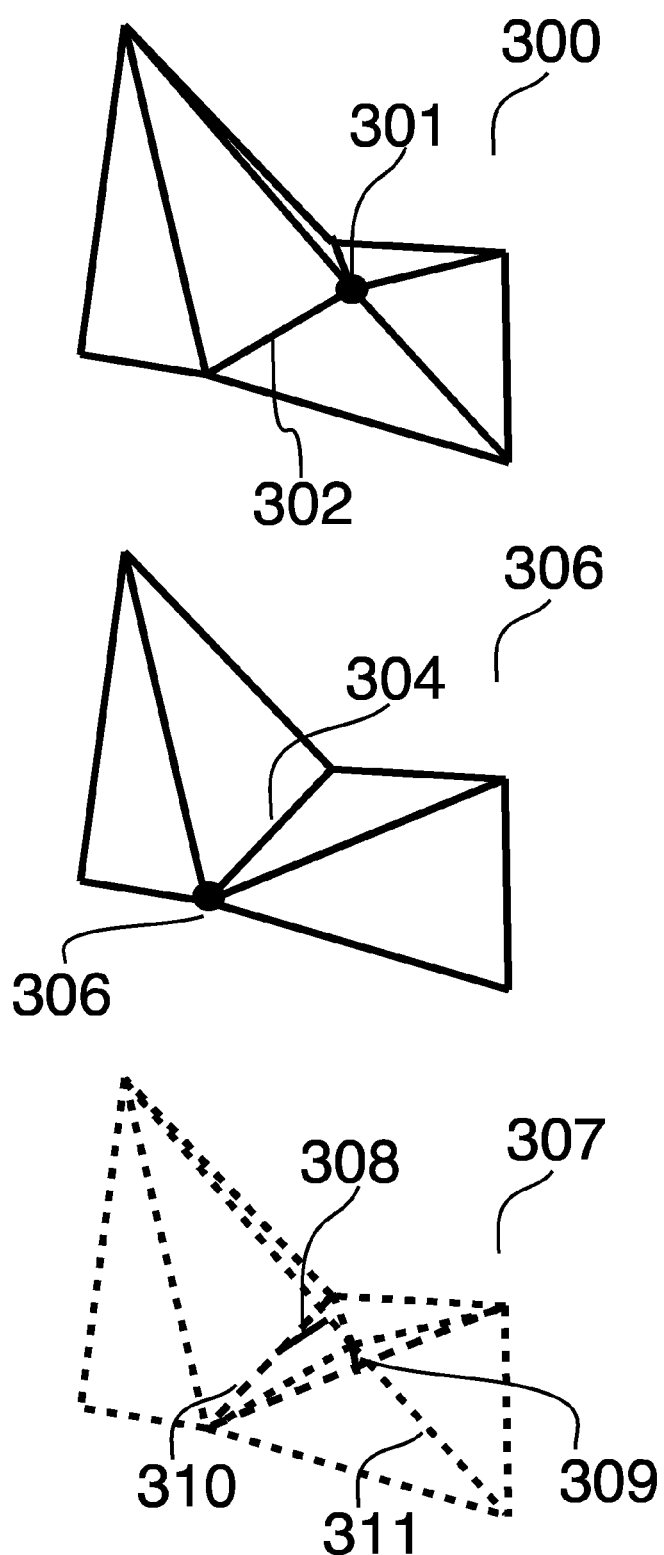
FIG. 3. Displays a 3D mesh data that is simplified and also shows distances between edges of the original mesh and the reduced mesh.
Figure 4:
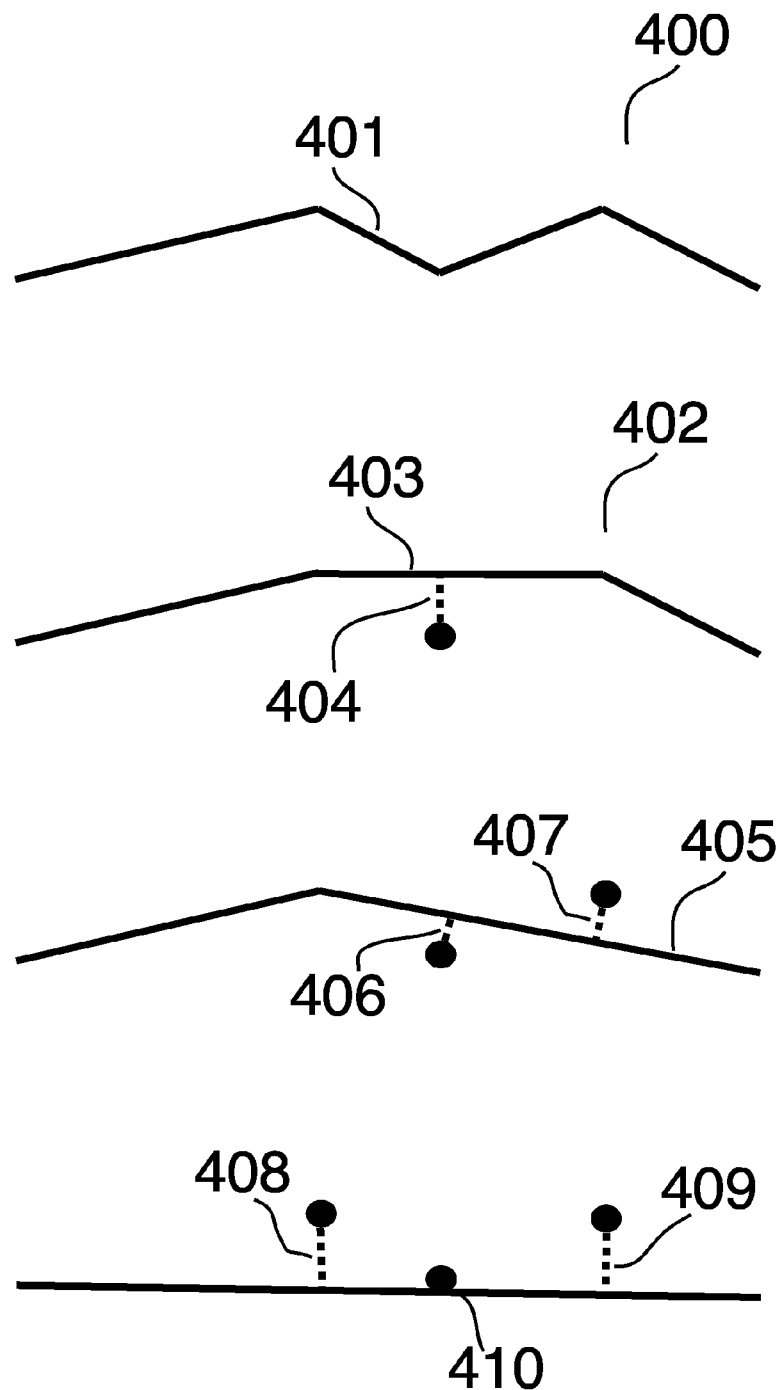
FIG. 4. Displays projection and reprojection of vertice data in 2D geometrical data during simplification in several steps.

This invention discloses a method for simplifying geometrical data in higher dimensions and in particular reducing three-dimensional (3D) mesh 801 from an original 3D mesh 800. The method could also be applicable to a two-dimensional mesh 400 or higher dimensional meshes, where especially meshes in higher dimensions than three can be simplified using similar Euclidian geometrical operations to those disclosed. Furthermore the invention is disclosed by assuming that the mesh comprises triangles (such as shown in FIGS. 2 and 3), however the invention is applicable to any mesh with arbitrary faces.

The simplification/reduction method comprises a series of edge-collapse operations that maps the original mesh onto the reduced mesh with each subsequent edge-collapse. The mapping allows access to exact knowledge what point on the original mesh that corresponds to a given point on the reduced mesh, and vice versa, and gives rise to a number of advantages, including the possibilities of calculating exact distances between simplified data and original data.

When producing a series of reduced meshes with different distances from the original mesh, no re-computing has to take place. One can simply keep reducing the data that is stored, and all reduced meshes can be produced at once. The data can also be used for mapping surface-data such as texture-values from the original mesh onto a reduced mesh without having to use ray-casting methods. It can also be used for computing the volume-difference between the original mesh and the reduced meshes, and gives positions for vertices for geomorphic-operations.

Mapping the Original Mesh onto the Reduced Mesh

The distance bounded simplification method starts by first looking at the local group where an edge collapse/edge removal takes place. This group is defined by all the triangles that are affected by the edge-collapse operation. An edge and its adjacent triangles are removed, and the two vertices connected through that edge are merged into one. Even simpler is the half-edge collapse, where one of the vertices is merged unto the other. For simplicity the half-edge collapses operation is used for explaining the method here, however the method is also applicable to any other type of edge removal operations.

Figure 5:
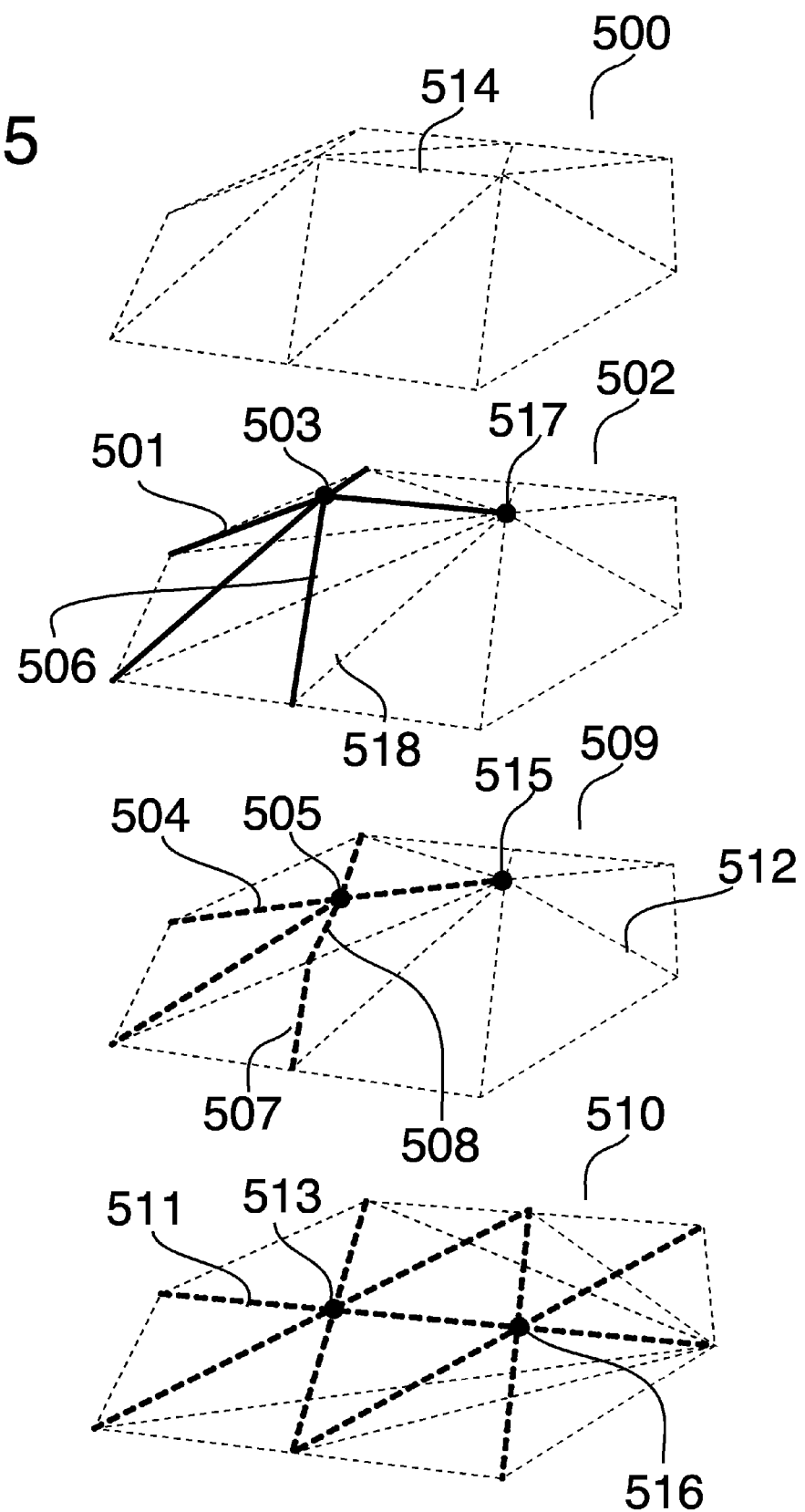
FIG. 5. Displays projection and reprojection of vertice and edge data in 3D geometrical data during simplification in several steps.
Figure 7:
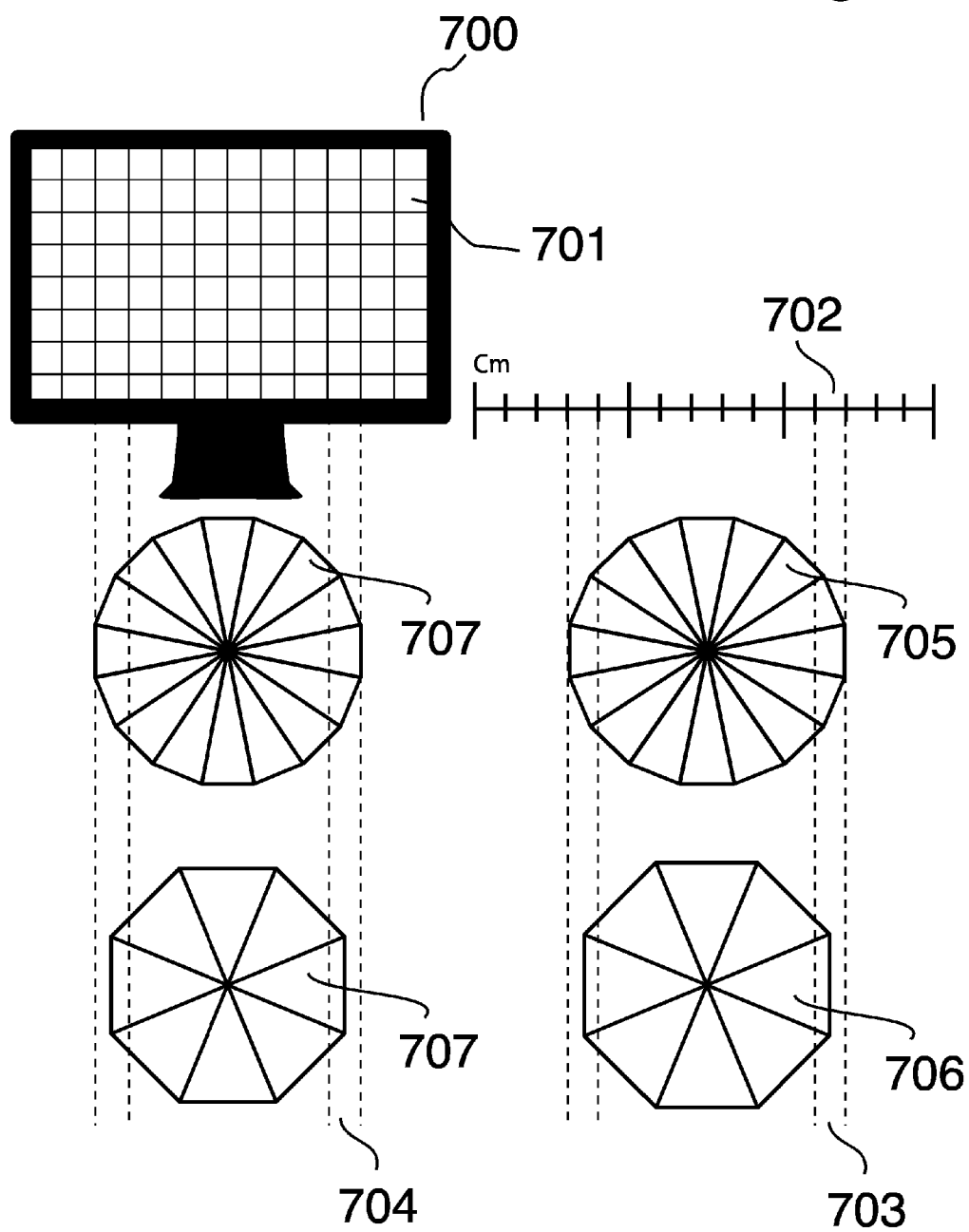
FIG. 7. Shows simplification of geometric data within a distance bound, defined by pixel size or absolute distances.

In further steps the closest position p (e.g. 605 in FIG. 6) on the reduced group to the removed vertex v (e.g. 503 in FIG. 5) in the original group is calculated. After calculating the position p, all the lines on the collapsed group that correspond to all the edges adjacent to the vertex v in the original group are found, using the straightest paths-method (FIG. 6). The straightest path method in more detail comprises finding the straightest path from the position p on the collapsed mesh, to each border-vertex of all the groups that are involved in the collapse-operation. The straightest path is calculated by creating a plane 602 that intersects with the position p (e.g. 605) and the end-vertex of the selected edge. The normal of this plane can be calculated using the cross-product from the vector of the selected edge, and the vector between the vertex v and the position p. Detailed information on methods for calculating straightest paths can be found in geometry books. This calculation is done for all involved edges in the original group. When that is done, the original mesh has successfully been mapped onto the collapsed group.

When doing subsequent collapses, according to the disclosed method, it is important to keep track of what edges that belong to the original mesh, and what edges that are re-computed after an edge collapse. The reason for this track keeping is that subsequent collapses will re-map the computed paths and edges that belong to the original mesh, but none of the edges that are re-computed on the reduced mesh. It is therefore solely the original mesh that should be mapped onto the reduced mesh, and none of the data from the reduced meshes in-between. This has to be done in order to correctly compute the exact distance, and the volume-difference from the original group to the reduced group. However in order to compute correct distance from any given point on either group onto its corresponding point on the other group with minimum stretch, such as texture stretch, some further calculations can be made.

By comparing the length m to an edge on the original group, and the length n of its corresponding path on the reduced mesh, the stretch s of the edge is calculated as s=n/m. The point p (e.g. 605) should be positioned such that the stretch of all the remapped edges of the original group are as close as possible, we then get the positions for the mapping so we can find the true corresponding point on each group onto the other. This will result in the best values for operations that map surface-data from the initial group mesh onto the mesh of the reduced group.

Computing Absolute Metrics (Distance and Volume)

The effect of projecting and saving projected data in the disclosed method is that absolute geometrical metrics can be calculated between the reduced mesh and the initial mesh at any step of the simplification.

When calculating absolute distances for mesh data there are two types of distances that should be computed. The first comprises the distances between the original positions of collapsed vertices to the mapped position of those vertices on the collapsed surface. This calculation is fairly trivial. The other distances to be computed are those of the original edges to that of their corresponding path on the collapsed mesh. If the corresponding path doesn't cross any of the edges on the collapsed surface there is no need to calculate their distance, since the endpoints of the path will be of equal or greater distance. When the path is crossing an edge however, then the distance from the crossing edge and the paths original edge must be calculated, as seen in the FIG. 3. The absolute distance is finally the largest of all the calculated values according to this described method.

In a similar fashion absolute volumes can be calculated. In the case of three-dimensional meshes the volume can be defined by the space between the surfaces of the initial group and the reduced group. One method of calculating this volume is to use a value that is proportional to the surface areas x absolute distance of these surfaces.

Similar methods of calculating distance volume or other relevant geometrical metrics can be applied to other types of 3D data as well, using projected data values.

Different Modes of Volume or Distance Bound Mesh Simplification

As the methods disclosed for mapping and calculation of distances 702 are performed in each subsequent edge removal/collapse step, the operation can result in a number of end results.

For distance bounded simplification the operations is terminated if the calculated absolute distance at a certain step reaches a value that is greater than a user defined distance.

In other modes it is possible to define a number of different distance values, and save the mesh as the values are reached at each step, resulting in a number of meshes with different user defined level of details.

Geomorphing

By saving projected data during subsequent edge collapse operations it is possible to create advanced geomorphs between different levels of simplified meshes. A method by which such 3D morphing can be implemented comprises choosing a simplified level of mesh and add all the projected data to said mesh, and then moving the projected vertices and edges to their instanced initial values.

Handling Boundaries

The disclosed method of simplifying a mesh can be extended to preserve certain features during the simplification method in addition to preserving absolute metric values. In mesh objects for example different type of borders often defined as paths along the edges of the mesh are important attributes to preserve. Previous work has disclosed methods for assigning error values to edges during edge collapse based simplification, where these error values have been extended with additional error penalties for border edges. The exact same methods can be implemented as additions to the disclosed invention.

Auto Creation of LODs Depending on the Size of the Object on the Screen

The disclosed methods of simplification can be applied for automatic simplification of a mesh for visualization on the screen with a specified maximum resolution. This is done by calculating the absolute distance for distance bounded simplification based on the absolute on screen pixel error. The most straightforward method is to calculate the absolute distance of the size of the 3D data, for example by calculating the largest distance among the distance between all the vertices in the 3D data. This distance can then be divided by the maximum number of pixels on the screen to achieve an absolute distance for bounded simplification.

Auto Creation of LODs Depending on the Size Voxels

A number of different algorithms can be used to create 3D meshes from voxel data, including the marching cubes algorithm. These 3D meshes could be simplified using a similar method as the pixel error method described above, where voxel resolution is used instead of pixel resolution.

Using LODs for Rendering

The methods of automatic simplification of meshes to an absolute pixel resolution can be used to create several level of details for individual objects and use these depending on the absolute pixel size for enhancing rendering times. The same method can also be used for creating hierarchical level of details, such as quad-tree based hierarchical level of details for terrain.

Texture Mapping

In computer graphics applications often data from a high resolution mesh is projected to the texture of the simplified version of the same mesh. The method of projecting data disclosed here can be used to first simplify a mesh having a texture and then using the instances of the save projected data, instancing the original mesh, in order to directly fetch mesh data from the hires mesh for the texture. A method of implementing this could comprise saving instances to the projected data also in the mesh during the simplification steps.

Mesh Repair/Healing 3D mesh data can often contain defects due to conversion problems, human error, scanner errors and more. Some error types including T-junctions, holes in the mesh, duplicates of vertices/triangles or edges, and flipped triangles, are not handled by the disclosed invention. These types of error could however be repaired using other methods prior and also before performing the operations of the disclosed inventions, due to the generality of the mesh types that are handled by the disclosed invention.

The invention claimed is:

1. A method of simplifying initial geometrical data to achieve a pre-defined metric bound, the initial geometrical data comprising an initial mesh in three dimensions or more and having a plurality of faces with each face defined by a plurality of vertices connected by edges, wherein one or more steps of the method are implemented by a processor, and wherein the method comprises the steps of:
   a) selecting one of the plurality of vertices in the initial mesh,
   b) identifying a set of edges connected to the selected one of the plurality of vertices,
   c) reconnecting the identified set of edges to an adjacent vertex, thereby forming a reduced mesh in three dimensions or more and having a reduced number of faces in a plurality of different planes,
   d) calculating a projection of the selected one of the plurality of vertices and the set of edges onto at least one face of the reduced mesh,
   e) calculating a reprojection of any previously projected vertices and edges onto the faces of the reduced mesh,
   f) saving the calculated projection of the selected one of the plurality of vertices and the set of edges and the calculated reprojection of any previously projected vertices and edges as projection data, and
   g) calculating a geometrical metric based on a relationship between the projection data and the initial mesh,
   wherein steps a)-g) are repeated until the calculated geometrical metric exceeds the predefined metric bound.

2. The method according to claim 1, wherein the step of selecting one of the plurality of vertices includes selecting one of the set of edges connecting a first vertex and a second vertex, wherein the first vertex forms the selected one of the plurality of vertices and the second vertex forms the adjacent vertex.

3. The method according to claim 1, wherein the steps of the method are performed on the initial mesh in a number of parallel steps.

4. The method of claim 1, wherein the projection of the selected one of the plurality of vertices onto the reduced mesh is calculated so that a distance between the selected one of the plurality of vertices and the projection of the selected one of the plurality of vertices and the set of edges is minimized.

5. The method according to claim 1, further comprising the step of:
   increasing the pre-defined metric bound.

6. The method according to claim 5, further comprising the step of:
   saving the reduced mesh prior to increasing the pre-defined metric bound.

7. The method according to claim 1, wherein the pre-defined metric bound comprises a geometrical distance, and wherein the step of calculating the geometrical metric comprises the step of:
   calculating the geometrical distance between the plurality of vertices of the initial mesh and the calculated projection of the selected one of the plurality of vertices and the reprojection of the previously projected vertices of the reduced mesh.

8. The method according to claim 1, wherein the pre-defined metric bound comprises a geometrical volume, and wherein said step of calculating the geometrical metric comprises:
   calculating the geometrical volume occupying a space between the reduced mesh and the initial mesh.

9. The method according to claim 1, wherein said step of selecting the selected one of the plurality of vertices includes randomly selecting an arbitrary vertex among all vertices in the initial mesh.

10. The method according to claim 2, wherein the step of selecting the selected one of the set of edges includes calculating an edge removal error value for each edge and selecting an edge having a minimum edge removal error value.

11. The method according to claim 10, further comprising the step of:
   defining border edges located on a border of the initial mesh, and increasing the edge removal error value for the border edges to preserve the border edges.

12. The method according to claim 1, further comprising the step of:
   performing arbitrary geometry operation methods on the initial geometrical data, the arbitrary geometry operation methods including joining vertices, joining vertices and edges, joining edge and edge, removing sliver triangles, removing T-junctions, hole-filling, and combinations thereof.

13. The method according to claim 1, wherein the initial mesh comprises a texture, and an association between the selected one of the plurality of vertices and the projection is used to map the texture to the reduced mesh.

14. The method according to claim 1, further comprising the step of:
   simplifying the reduced mesh to an absolute distance, wherein the absolute distance is proportional to an absolute data size divided by a pixel size.

15. The method according to claim 1, further comprising the step of:
   transforming voxel data to initial mesh data wherein the pre-defined metric bound is further defined as a distance proportional to a voxel size.

16. The method according to claim 1, wherein the pre-defined metric bound is further defined as a distance and is proportional to a distance inaccuracy of a scanner apparatus utilized to input the initial geometrical data.

17. The method according to claim 1, wherein the pre-defined metric bound is further defined as a distance and is proportional to an accuracy of a computer aided manufacturing apparatus.

18. The method according to claim 1, further comprising the steps of:
   saving the projection to the reduced mesh, and
   moving the projection and each of the saved previously projected vertices stepwise through a trajectory to an associated selected vertex of the initial mesh.

19. The method according to claim 1, wherein the pre-defined metric bound is defined by an accuracy of a simulation including finite element method simulations, mechatronics, and rigid body dynamics.

20. The method according to claim 1, further comprising the steps of:
   splitting initial geometrical data into hierarchical subgroups, and
   simplifying each hierarchical subgroup by performing the steps a)-g) on each hierarchical subgroup.

21. The method according to claim 20, further comprising saving each simplified hierarchical subgroup for further use in visualization applications.

* * * * *